United States Patent [19]

Hutchison

[11] 4,348,798

[45] Sep. 14, 1982

[54] METHOD OF MANUFACTURING SOLAR COLLECTOR MODULE

[75] Inventor: Joseph A. Hutchison, Dallas, Tex.

[73] Assignee: Solar Kinetics, Inc., Dallas, Tex.

[21] Appl. No.: 275,637

[22] Filed: Jun. 22, 1981

Related U.S. Application Data

[62] Division of Ser. No. 86,314, Oct. 19, 1979, Pat. No. 4,297,003.

[51] Int. Cl.³ ............................................. B23P 11/02
[52] U.S. Cl. .................................... 29/448; 29/157 R; 228/182
[58] Field of Search .................. 29/469, 434, 448, 449, 29/455 R, 157 R, 157.3 R, 156.8 B; 126/438, 439; 228/182; 350/292

[56] References Cited

U.S. PATENT DOCUMENTS

| | | | |
|---|---|---|---|
| 1,984,007 | 12/1934 | Babbit | 29/455 R UX |
| 2,233,969 | 3/1941 | Woods | 29/455 R X |
| 2,810,816 | 10/1957 | Hardesty | 29/455 LM UX |
| 3,011,254 | 12/1961 | Melill et al. | 29/455 LM X |
| 3,110,961 | 11/1963 | Melill et al. | 29/455 LM X |
| 3,959,056 | 5/1976 | Caplan | 126/438 X |
| 3,973,834 | 8/1976 | Penn et al. | 29/448 UX |
| 4,098,264 | 7/1978 | Brokaw | 126/438 X |
| 4,135,493 | 1/1979 | Kennedy | 126/438 X |
| 4,178,913 | 12/1979 | Hutchison | 126/438 X |

*Primary Examiner*—Charlie T. Moon
*Attorney, Agent, or Firm*—John F. Booth; Gerald G. Crutsinger; Monty L. Ross

[57] ABSTRACT

An extended width parabolic trough solar collector (12) is supported from pylons (14). Collector (12) is formed from a center module (30) and two wing modules (32) joined together along abutting edges by connecting means. A stressed skin monocoque construction is used for each of the modules.

3 Claims, 11 Drawing Figures

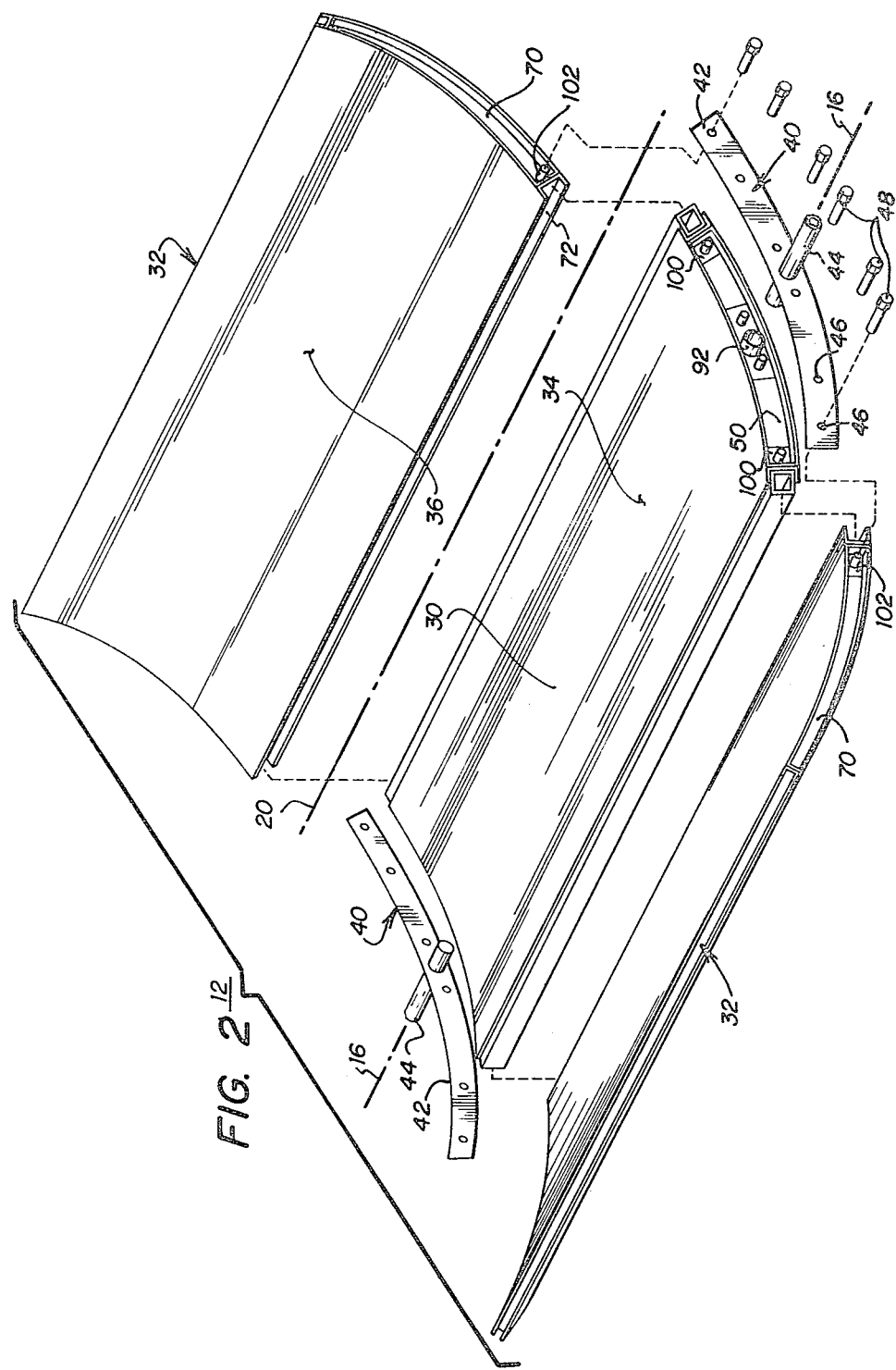

METHOD OF MANUFACTURING SOLAR COLLECTOR MODULE

CROSS REFERENCE TO RELATED APPLICATIONS

This application is a division of application Ser. No. 06/086,314, filed on Oct. 19, 1979, of Joseph A. Hutchison, now U.S. Pat. No. 4,297,003, issued Oct. 27, 1981.

FIELD OF THE INVENTION

The present invention pertains to reflective trough type solar collectors and more particularly to an extended width efficient solar collector constructed using a plurality of high structural integrity modules connected together and the method of installing the same.

BACKGROUND ART

Systems are used to convert solar energy into other forms of energy which can be used or stored. These systems utilize a solar collector which collects the solar radiation and converts the solar energy therein into a useable form of energy such as heat. Solar collectors of the flat plate type have been utilized in low energy applications such as heating water, generating low pressure steam, and supplementing air conditioning and heating systems and the like. Flat plate collectors do not focus the sun's radiation and have limited applicability. Another type of collector is generically called a concentrating collector. These collectors function to collect the sun's radiation energy and focus or concentrate the energy in a particular area. These concentrating collectors can be designed to operate at high temperatures with reasonable flow rates, thus substantially increasing the versatility of systems incorporating these collectors over that of flat plate collectors.

One type of concentrating collector is known as the parabolic trough collector. This type collector uses an elongated reflective trough having a parabolic cross-section to concentrate the sun's radiation along a focal line extending through the focal points of the parabolic elements of the trough. A conduit can be positioned along this focal line and a heat transfer liquid can be circulated through the conduit. The liquid will be heated by the sun's energy. Satisfactory flow rates at high temperatures can be obtained from these collectors. It has also been found that by use of tracking systems these parabolic trough collectors can become extremely efficient as they follow the movement of the sun. Designs for these collectors can be found in the prior art such as is disclosed in my prior application Ser. No. 853,213 filed Nov. 21, 1977, now U.S. Pat. No. 4,240,406, issued Dec. 23, 1980.

Trough type collectors are becoming accepted as the most efficient and versatile means of generating energy from solar radiation. As solar systems are used to satisfy larger energy requirements, the systems incorporating the collectors become physically larger. Presently, systems using a plurality of collectors whose aggregate collector surface approaches a thousand square meters are in use. These systems have been used as solar collectors in systems for irrigation pumping; solar heating and air conditioning; steam generation for raw crude oil processing and other industrial applications; generating electrical energy directly from photovoltec cells; and powering small power plants.

Conventionally, trough type solar collectors have been supported on an axis extending parallel to the focus line. These collectors are journaled by bearings to rotate to point the reflector surface directly toward the sun. Typically, two pylons or supports are rigidly mounted to support the individual collectors in a rotatable position elevated from the surface of the ground.

To achieve the collector areas required for some applications it has been conventional to utilize collectors of a size approximately six meters long and approximately two and one-half meters wide. A plurality of these collectors are mounted in an array or field. In some applications as many as six collectors are mounted on a common axis and are mechanically connected together so that all six collectors may be rotated to track the sun as a single unit. A plurality of these rows are utilized to obtain the total collector area required for the particular application. Attempts have been made to lower the per unit area cost of support equipment such as the tracking units for each row by increasing the length of each row. The benefit of these attempts have been offset by the torsional flexibility added to the system by increasing the overall length of an interconnected row of collectors and thus increasing the length to width ratio. This flexibility creates problems in focusing the collectors and in preventing damage to the system during high winds. Stiffening the individual collector units themselves suffers from the disadvantage of substantially increasing the manufacturing costs. It was also believed in the industry that attempts to increase the width of the collector substantially beyond the two and one-half meter range could not be achieved due to manufacturing, structural, transportion and handling problems caused by a unit of such a size. Thus, the solar industry is faced with a problem of providing an inexpensive and efficient solar collector to satisfy large energy applications.

One attempt to solve this problem is proposed by a Mr. Caplan in his U.S. Pat. No. 3,959,056. To attack the problem, Mr. Caplan proposes in his patent to use a honeycomb construction for a concentrating type collector. Mr. Caplan suggested the provision of fabricating apparatus mounted on semitrailer trucks. The trucks could be positioned at the site to produce collectors having a width in the area of sixteen feet and a length in the area of forty feet. It is inherent in Mr. Caplan's system that the efficiency of a permanent factory and personnel would be abandoned and that an expensive honeycomb material construction would be necessary. The system proposed by Mr. Caplan apparently is as a result of the inventor's (and solar industries') belief that large width focusing solar collectors could not be manufactured at a fixed plant because of the problems attendant to manufacturing, shipping, and installation of these large modules.

Even though this great need for collectors of substantial width is recognized in the industry, no one to Applicant's knowledge has proposed an economical system for manufacturing and installing solar collectors of extended width.

DISCLOSURE OF THE INVENTION

According to the present invention, a solar collector structure of extending width is disclosed which can be constructed in an efficient manner which can be simply and easily transported and installed. In addition, a method for installing these extended width collectors is disclosed.

More particularly, the present invention discloses a parabolic trough collector which is constructed in modular form and which, in the preferred embodiment, is constructed from three separate modules extending the length of the collector. In the preferred embodiment, a center module is provided with two wing modules connected to the edges of the center module to form a parabolic trough. The internal surfaces of the individual modules are matched to interrelate to form a single parabolic reflector when connected together. Accordingly, I have discovered that I could improve my stressed-skin monocoque solar collector construction concept which is described in my co-pending patent application Ser. No. 853,213 filed Nov. 21, 1977, now U.S. Pat. No. 4,240,406, issued Dec. 23, 1980 to efficiently design and manufacture solar collectors of extended width. I have accomplished this by manufacturing a plurality of individual modules of a monocoque stressed-skin construction of a size which can be easily transported and later connecting these modules together to form solar collectors of extended widths. In addition, I have discovered that by utilizing collector modules each of which extends the length of the collector and to connect the edges of the modules together that an acceptable collector can be manufactured.

In one embodiment the adjoining edge of each module has a channel formed therein and a piece of tubing is inserted into the channels and joined thereto by suitable fasteners to interconnect the modules along their edge. In another embodiment, a specially formed connector is fastened in place along the edge of one of the modules and is shaped to have a protruding portion extending along the length thereof for insertion into the opening in a channel member connected to the adjacent module along its edge. In still a further embodiment, an outwardly extending flange is positioned substantially around the top and bottom surfaces of the collector module to facilitate construction thereof.

In addition, the particular construction of the improved modular extended width solar collector is such that it lends itself well to an efficient method for installing the same. This method utilizes the steps of first erecting spaced supporting pylons about which the collector module will be supported and rotate for tracking the sun's movement. A central module is lifted into place and supported from the two pylons at the site. The wing modules are then coupled to the central module after it is already in place on the pylons with the pylons acting both as a support and as a fixture for allowing assembly of the modular collector itself.

All of the attendant advantages and features of the present invention can be appreciated by referring to the details of the present invention as shown in the accompanying drawings and as described in the detailed description herein.

BRIEF DESCRIPTION OF THE DRAWINGS

For a more complete understanding of the present invention and the advantages thereof, reference is now made to the following description taken in conjunction with the accompanying drawings in which:

FIG. 2 is an enlarged exploded perspective view of a solar collector formed from three modules showing two wing modules and a center module disconnected and with the torque transfer arms removed;

DETAILED DESCRIPTION OF THE INVENTION

Figure 1:
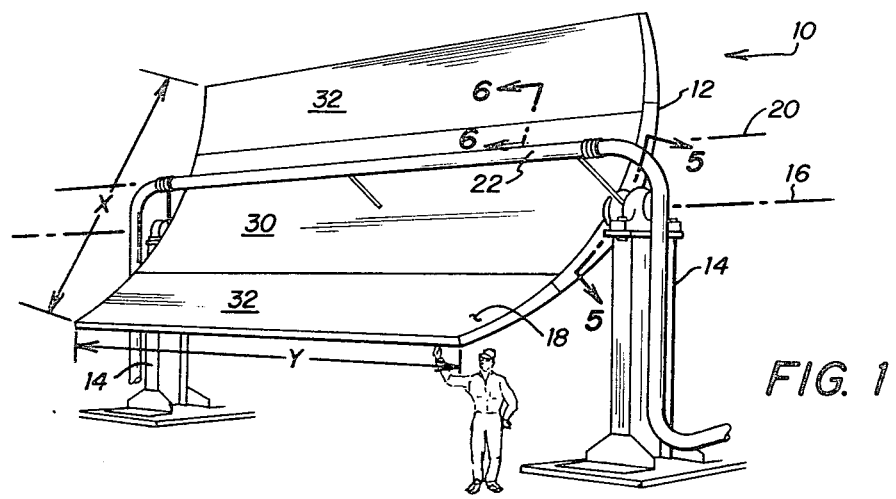
FIG. 1 is a perspective view of one embodiment of the extended width modular collector of the present invention shown in a parabolic trough embodiment.

By referring to the drawings, the details and advantages of the present invention will be described. Reference numerals will be used during the description to indicate parts or portions of the improved collector module of the present invention. Throughout these views, like reference characters will be used to designate like and corresponding parts in various views.

In FIG. 1, the improved solar collector assembly of the present invention is illustrated and is identified generally by reference numeral 10. In the embodiment illustrated, the collector assembly is of the parabolic trough type but it is to be understood, of course, that other reflector shapes could be utilized to practice the present invention.

The collector assembly 10 is illustrated as comprising a collector 12 supported from a pair of spaced vertically extending pylons 14. The collector 12 is shown supported from the pylons in an elevated position. The collector is mounted to relate about a horizontally extending axis 16 on shafts (not shown) which are supported in corresponding bearings mounted on pylons 14. The pylons 14 are positioned to maximize the efficiency of the collector assembly 10 for the particular geographic location. In some geographical areas it may be desirable to place the axis of rotation 16 parallel to an east-west line. In others, it may be more efficient to place the axis of rotation 16 parallel to a north-south line, or even some other directional bearing.

Rotation of the collector 12 about horizontal axis 16 is accomplished through a suitable tracking means (not shown) which aims the collector toward the sun to obtain maximum efficiency of the system at all times. In addition, rotation of the collector to a downwardly facing position at night or during severe weather can be accomplished to protect the collector from damage. A means of accomplishing mounting of the collector and tracking is disclosed in my copending patent application Ser. No. 864,089 filed Dec. 23, 1977 now U.S. Pat. No. 4,178,913, issued Dec. 18, 1979.

It is to be understood, of course, that the collector 12 is illustrated in FIG. 1 as a single element. It is to be understood, of course, that a plurality of collectors 12 could be connected in a row to allow the use of a common tracking mechanism.

The collector illustrated in FIG. 1 is of an extended width collector approximately 6.7 meters wide. The width of the collector is shown as dimension X in FIG. 1 and represents the maximum apperture width of the collector surface. The length of the collector is shown as dimension Y, which extends parallel to the axis of rotation 16. In the embodiment shown, the length or dimension Y is approximately 6.1 meters long.

The collector 12 has a parabolic reflective (or front) surface 18 which extends the length of the collector. This reflective surface 18 is designed to focus along a focal line 20. In the embodiment shown, a conduit 22 is positioned along the focal line 20. In operation, liquid is circulated by pumps or other means not shown through the conduit 22 wherein the liquid is heated by radiation energy reflected from the parabolic surface 18 and focused on the conduit 22. Energy in the form of heat can then be recovered from this fluid. In other embodiments, photovoltec cells are placed on the collector 12 along the focal line and are used to directly convert the solar radiation into electrical energy.

According to a particular feature of the present invention, the collector 12 is constructed from separate modules which are interconnected together. Each of these modules extends the full legnth of a collector and are manufactured at a plant and transported to a site and connected together. In the embodiment shown, collector 12 consists of a center module 30 and two wing modules 32. As will be described in detail, each of these modules is of a monocoque-stressed skin construction, i.e., the skin or covering absorbs or carries all or a large part of the stresses to which the module is exposed.

In FIG. 2, the collector 12 is illustrated in an exploded view with the wing modules 32 disconnected from the center module 30. It has been found that by designing each of these modules with a maximum width of less than about two and one-half meters, the modules 30 and 32 can be easily transported and handled by conventional along the edges thereof to form a rigid collector structure. The front surfaces 34 and 36 of the modules 30 and 32 respectively are provided with a reflective coating. This coating can be a highly polished material which will reflect solar radiation. The front reflective surfaces 34 and 36 are designed to be complimentary and when assembled together, the surfaces 34 and 36 conform to the shape of a single parabolic trough. It is to be understood, of course, that the reflective shape could conform to other configurations as desired by the particular application. In the present embodiment, the shape is a parabolic trough and interior surfaces 34 and 36 are positioned to reflect the sun's radiation toward the focal line 20. Focal line 20 extends parallel to the axis of rotation 16 and is occupied by the conduit 22.

In addition, a torque transfer arm assembly 40 is connected to the ends of the modules 30 and 32. Assembly 40 functions to support the collector 12 from the pylons 14, to transfer torque between adjacent collectos 12, and to interconnect and stiffen the modules 30 and 32. The torque transfer arm assembly 40 has a torque transfer plate 42 which is rigidly connected to a shaft 44. In the present embodiment, the shaft 44 is shown welded to plate 42 but it is to be understood, of course, that other means of attachment could be used. Plate 42 has a plurality of bores 46 which provide clearance for fasteners 48 to extend through the plate 42 and engage portions of the modules 30 and 32 to rigidly connect the torque transfer arm assembly 40 thereto. The shaft 44 is of a size and shape to be received in a conventional bearing assembly (not shown) on the pylong 14 to support the module for rotation about axis 16. The shaft 44 can have gears or other means attached thereto to drive the shaft and thereby utilize the collector 12 for tracking movement of the sun. In addition, the shaft 44 can be of a sufficient length to interconnect adjacent collectors 12 of a row through the spaced pylons 14.

Figure 3:
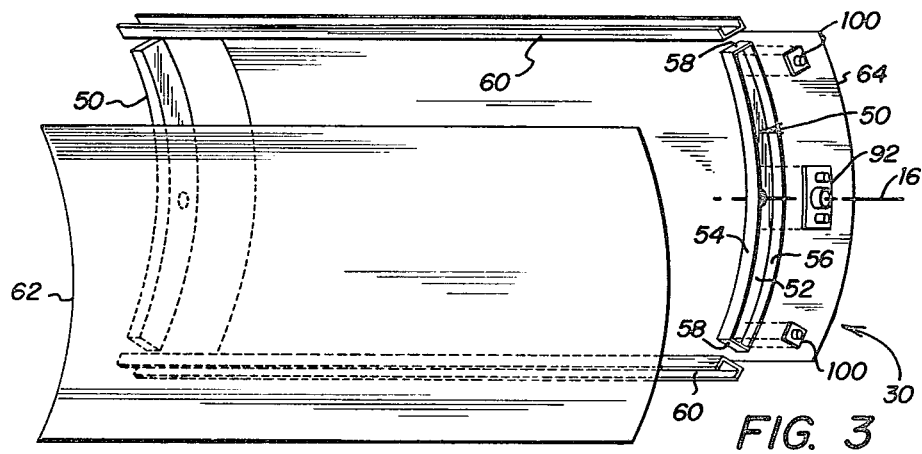
FIG. 3 is an exploded perspective view of the center module of the collector shown in FIGS. 1 and 2.
Figure 4:
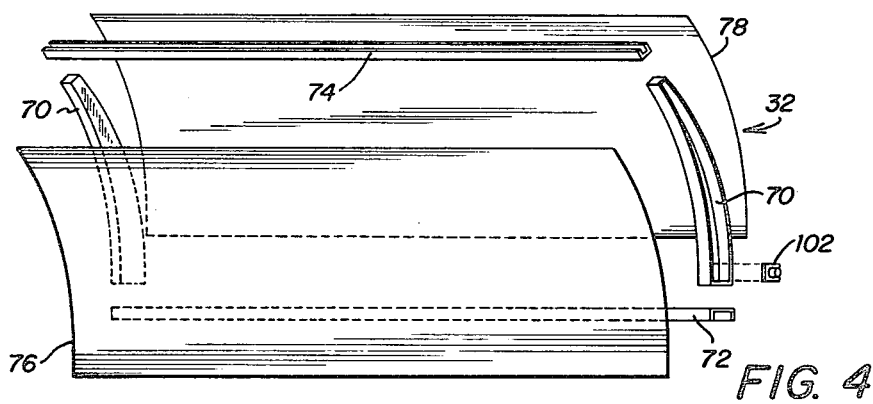
FIG. 4 is an exploded perspective view of the wing module of the collector shown in FIGS. 1 and 2.

According to a particular feature of the present invention, the modules 30 and 32 are of a unique monocoque stressed-skin construction. This construction is illustrated in FIGS. 3 and 4 for modules 30 and 32 respectively. Modules 30 and 32 are preferably in a parabolic trough shape and utilizes a plurality a precision formed bulkheads with a concave front surface formed at close tolerances to conform to a parabolic shape. In the embodiment shown, two bulkheads or end skins are used but it is to be understood, of course, that more bulkheads could be provided as desired. The monocoque construction of the present invention provides for the use of stressed skins which are rigidly fixed together. By constructing the modules 30 and 32 in this manner, stresses exerted on the structure are transferred through the stressed skins and are uniformly distributed without concentration across the entire panel structure. This monocoque construction technique can be utilized to form modules of sufficient strength at an economical cost.

The details of the monocoque-stressed skin construction of the module 30 are illustrated in FIG. 3, wherein the module is shown in exploded form. In the embodiment shown, the module 30 has a pair of end skins or bulkheads 50 which are made from a suitable material. One method of forming these end skins or bulkheads is to cast the bulkhead and then utilize a machining process to achieve a true parabolic shape on the front surface of the bulkhead 50. It is desirable, of course, that the front surface of bulkheads 50 each have a common profile so that all the bulkheads in a particular module will be substantially the same shape. It is also envisioned that the bulkheads 50 could be manufactured by roll forming the bulkhead 50 from a single sheet or material. This can be accomplished by rolling the bulkhead with a central web portion 52 and flanges 54, 56 and 58 on the front, rear and end surfaces respectively of the bulkhead. These flanges can be rolled into position and welded at the corners where the individual flanges come into contact. It is also envisioned that other metal forming techniques such as stamping or the like could be utilized, it only being important that the process produce a bulkhead 50 which is sufficiently rigid, has flanges 54, 56 and 58, and has a front flange 54 which conforms to the desired reflector shape. As will be described hereinafter in more detail, the flanges are utilized to attach the upper and lower skins of the module together.

According to the embodiment of the present invention shown in FIG. 3, a pair of channel members or connectors means 60 are provided along the side edges of the module 30 to form the edge skins of the module. These channel members 60 are positioned so that the concave portions of the channels arthereof. These channels 60 are rigidly fixed to the end flanges 58 of the end bulkheads 50 by welding, or some other suitable fastening. By assembling the bulkheads 50 and channels 60 in a four-sided curved frame configuration shown, further fabrication of the module can be performed from outside of the four-sided curved frame. This quadrilateral forms the edge and end skins for the stressed skin module 30.

Once this four-sided curved frame of the center module 30 is assembled, the front and rear skins 62 and 64 can be attached. As previously discussed, the upper surface of the skin 62 is reflective. The skin 62 is attached along the edges to the four-sided curved frame formed by bulkheads 50 and channel members 60. In a similar manner, the skin 64 is attached on the underside of the module. According to one particular advantage of the present invention, bulkheads 50 and channel members 60 have front flanges which lie in a parabolic surface and contact the front skin 62. Since these flanges lie in the proper plane and extend outward from the structure, rigid attachment of skin 62 to the frame is greatly simplified. For example, a spot welding technique can be utilized to connect the skin to the flanges or fasteners of conventional type can be utilized. The skin thickness should be selected to be of sufficient magnitude to provide a monocoque construction that will operate within the design environment required for the module 30. Thus, the module 30 when assembled has front and rear skins 62 and 64, respectively, and end edge skins formed by bulkheads 50 and channels 60, respectively. This monocoque construction greatly simplifies the construction of the module and reduces the cost thereof.

In a similar manner, the module 32 is constructed with a monocoque stressed skin construction. The details of this module 32 are shown in FIG. 4. The module 32 has a pair of end skins or bulkheads 70. These bulkheads 70 can be formed in the manner described with respect to bulkheads 50. Each end bulkhead 70 has front, rear and end flanges for attachment to the skins and edge channel members. The end bulkheads 70 taper in thickness and the front surfaces conform to the reflective surface desired, such that the module 32 will mate with the module 30 with the front surfaces, cooperating to form a parabolic surface. Interior skin channel 72 and exterior skin channel 74 are connected to the bulkheads 70 as previously described with respect to module 30 to form a four-sided curved frame for the wing module 32. Interior channel 72 is of the size and shape to correspond to the size and shape of channel 60. Front skin 76 and rear skin 78 are attached to the four-sided curved frame as previously described with respect to module 30.

Figure 8:
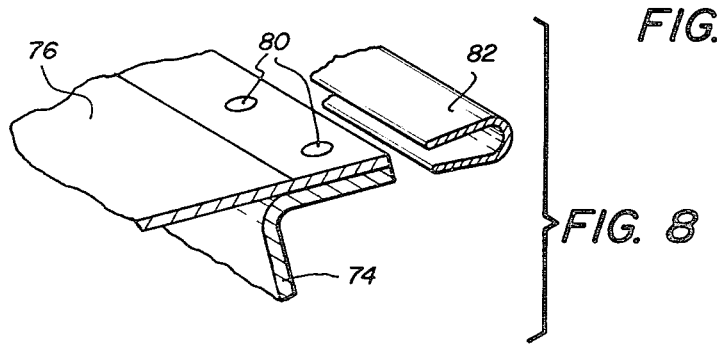
FIG. 8 is an exploded detail view showing a portion of the edge of a collector module.

In FIG. 8, a typical means of fastening the skin to the flange of a bulkhead or channel member is shown. In this view, the edge connection between the front skin 76 and the exterior channel 74 is shown. The skin 76 is welded at 80 to the outwardly extending flange of channel 74. Spaced spot welds 80 can be utilized. It is to be understood, of course, that other types of fasteners could be used.

A U-shaped clip 82 can be attached to fit over the exposed edges of the skin 76 and the flange of channel member 74. A suitable potting or sealing compound can be placed inside of the U-shaped clip 82 such that when the clip is in place the exposed edges are sealed. Preferably the clip 82 is formed in a shape to resiliently grip the extending edges of the skin 76 and channel member 74.

Figure 5:
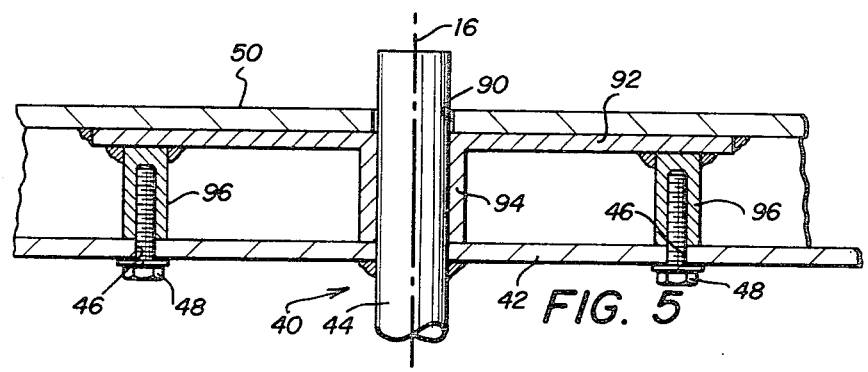
FIG. 5 is a section view taken on line 5—5 of FIG. 2 looking in the direction of the arrows showing the torque arm connected to the center module.

The details of connection of the torque transfer arm assembly 40 are shown in FIGS. 2 through 5. As can be seen in FIGS. 2, 3 and 5, the end bulkhead 50 of the module 30 has an opening 90 aligned with axis 60 and of a size to allow insertion of shaft 44 therethrough. A shaft receiving plate assembly 92 is positioned over the opening 90. As is shown in detail in FIG. 5, the shaft receiving plate assembly 92 has a cylindrical boss 94 extending out from the plate 92. The boss 94 defines a cylindrical passageway which is in alignment with opening 90, the passageway is of a size to closely receive shaft 44 therein. A pair of threaded bosses 96 are spaced on either side of the boss 94 and align with a pair of openings 96 in the torque transfer plate 92. Suitable fasteners 48 are used to attach torque transfer plate 42 by threadedly engaging to the bosses 96. Plates 100 with single threaded bosses 96 thereon are attached to the end bulkheads 50. The threaded bosses 96 are aligned with bores 46 for receiving fasteners 48. A plate 102 is attached to each of the bulkheads 70 adjacent to the channel 72. These plates 102 have threaded bosses which align with a bore 46 in plate 42 for receiving the fastener 48. Thus, the plate 42 rigidly connects the modules 30 and 32 together by means of the plates 92, 100 and 102 with the shaft 44 being received within the boss 94.

Figure 6:
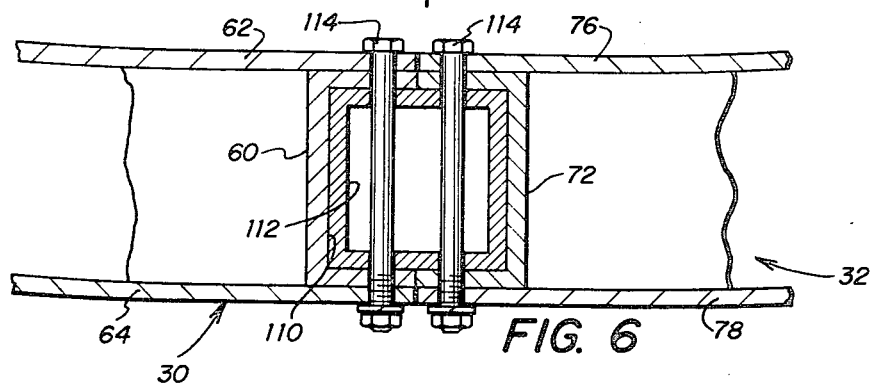
FIG. 6 is a section view taken on line 6—6 of FIG. 1 looking in the direction of the arrows showing the preferred embodiment of the connection between the wing and center module along one edge.

According to another feature of the present invention, modules 30 and 32 are each connected together along abutting edges. The details of this connection is illustrated in FIG. 5, wherein a typical connection can be seen. The concave portions of the edge of channels 60 and 72 form elongated sockets extending the length of the modules. When the modules 30 and 32 are placed with their edges abutting, a chamber 110 is formed by the sockets in channels 60 and 72. In the embodiment illustrated, tubing 112 has a cross-sectional size and shape to fit in the chamber 110. In the embodiment shown the tubing is rectangular. Suitable bores are formed in the modules 30 and 32 for receiving fasteners 114 therethrough. As seen in FIG. 6, a fastener 114 extends through the module 32 and tubing 112 to connect the module 32 to the tubing 112. In a similar manner, a fastener 114 extends through the module 30 and through the square tubing 112 to rigidly interconnect the module 30 and 32. The bores for fasteners 114 can be pre-drilled and pre-aligned at the site of manufacture of the modules and can be inserted at the installation site, allowing transportation of the modules in the unassembled form.

Figure 7:
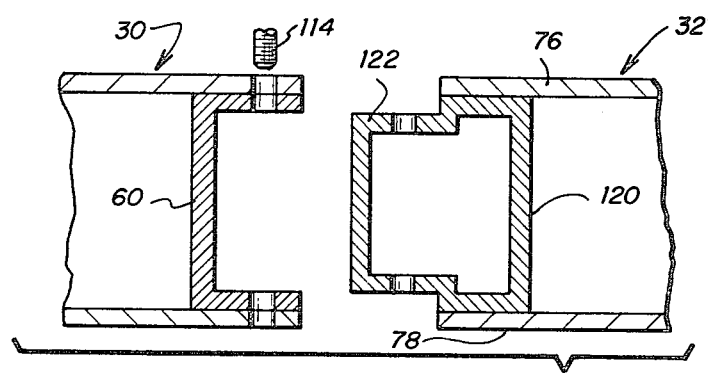
FIG. 7 is a view similar to FIG. 6 showing an alternate embodiment.

An alternate embodiment for connecting the modules is shown in FIG. 7. In this embodiment, the module 30 has a channel member 60 as previously described. The module 32', however, is different in construction from the module 32 and in place of channel 72 a special roll formed closed tubing section 120 is affixed. This section 120 has a portion of a proper width to contact skins 76 and 78. A reduced thickness protruding portion 122 is provided of a size to fit inside the channel member 60 and receive a fastener 114 through suitable clearance openings to attach the modules.

Figure 9:
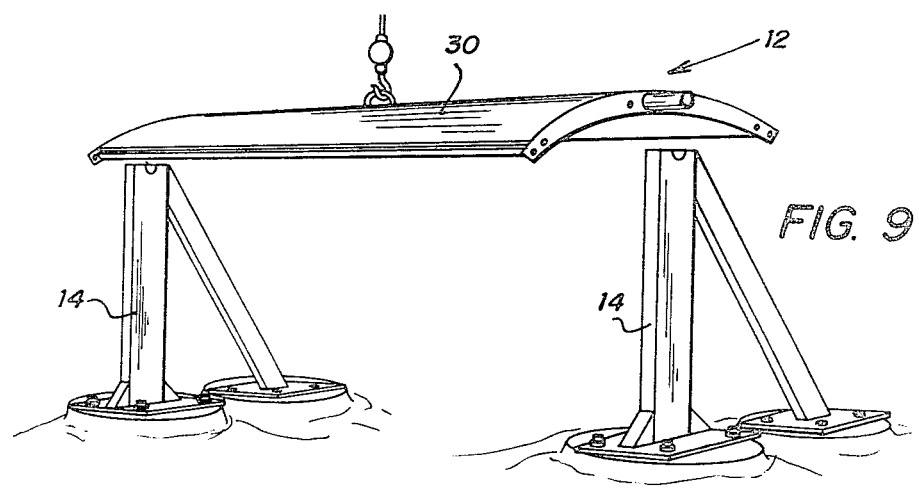
FIGS. 9 and 10 are perspective views showing the method of installing the collector of the present invention.
Figure 10:
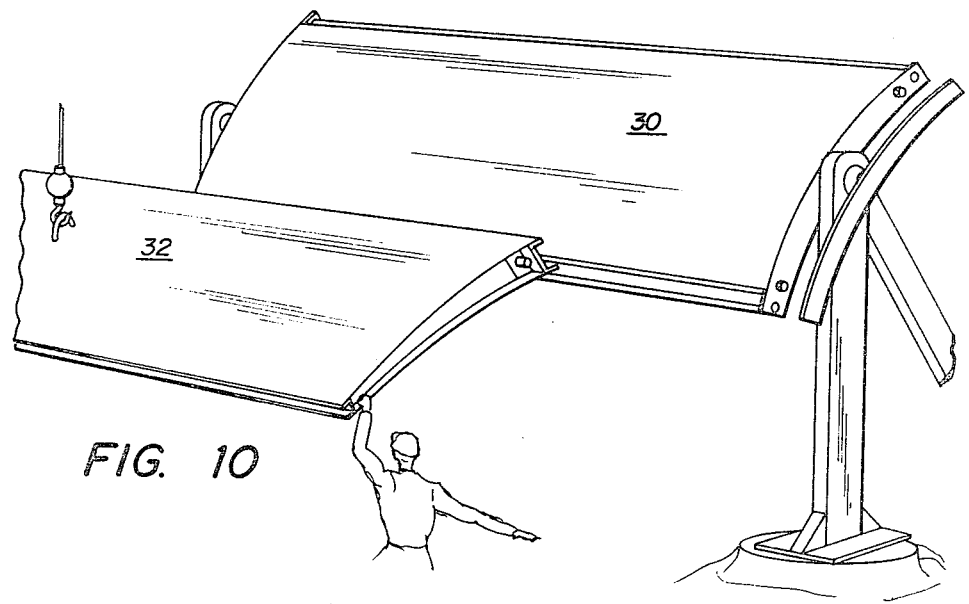

It should be appreciated that the structure of the collector 12 is such that it lends itself simply and easily to transportation and installation. In FIGS. 9 and 10, the basic steps of installation are illustrated. In FIG. 9, the pylons 14 are shown installed on suitable foundations. Thereafter the center module 30 can be lowered in place and mounted on the pylons as shown in FIG. 10. Next, a wing module 32 can be lowered into place and connected along one edge of the module 30. Finally, the other wing module 32 can be connected to the other side of the center module 30. Subsequently the conduit 22 (not shown) and the tracking apparatus (not shown) can be installed.

Figure 11:
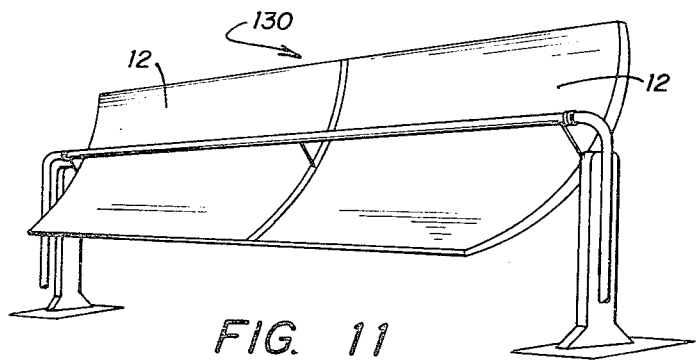
FIG. 11 is a view similar to FIG. 1 showing the use of two modular collectors connected end to end to form an increased length collector assembly.

In FIG. 11, another embodiment of the improved solar collector 12 of the present invention is shown. In this embodiment two collectors 12 are shown attached end to end to form a longer collector assembly 130 without pylons between the individual collectors 12. This is accomplished by using a connecting means such as is used along the edges of the individual modules 30 and 32 of the collector structure itself.

It is to be appreciated, of course, that the present invention is illustrated and described by reference to preferred embodiments and that numerous alterations and modifications may be made thereof without departing from the spirit and scope of the present invention. It is also anticipated that the present invention could be applied to construct collectors from more or less than three modules.

I claim:

1. A method of manufacturing a curved solar collector module comprising the steps of: forming a plurality of bulkheads and connector means with at least one corresponding front edge of each of said bulkheads conforming to a predetermined curved shape; forming flanges on the front and rear edges of said bulkheads and said connector means; forming a rigid four-sided curved frame by rigidly affixing connector means to spaced bulkheads whereby said bulkheads and said connector means each have flanges extending outwardly from said frame to form a flange which extends around each of the front and rear surfaces of said frame; rigidly affixing front and rear skins respectively to the front and rear flanges of said frame to form a monocoque having a curved front surface.

2. The method of claim 1 wherein said step of affixing said skins to said front and rear flanges of said frame comprises the step of welding said skins to said flanges.

3. The method of claim 1 additionally comprising the steps of: applying a sealing material to at least a portion of the joint between said skins and said flanges, and installing a U-shaped clip over at least a portion of the exposed edges of said skin and said flanges.

* * * * *

UNITED STATES PATENT AND TRADEMARK OFFICE
CERTIFICATE OF CORRECTION

PATENT NO. : 4,348,798
DATED : September 14, 1982
INVENTOR(S) : Joseph A. Hutchison It is certified that error appears in the above-identified patent and that said Letters Patent are hereby corrected as shown below:

Column 4, line 43, delete "relate" and insert -- rotate --;
Column 5, line 4, delete "apperture" and insert -- aperture --;
Column 5, line 25, delete "legnth" and insert -- length --;
Column 5, line 39, after "conventional" add -- means. Preferably, the center module 30 is symmetrical and thus both the right and left hand wing modules 32 are identical in construction. As is described hereinafter in more detail, the wing modules 32 are connected to the center module 30 --;
Column 5, line 58, delete "collectos" and insert -- collectors --;
Column 6, line 14, after "plurality" delete "a" and insert -- of --;
Column 6, line 62, delete "arthereof" and insert -- are facing outward and are of a size and shape to conform to the cross-sectional thickness of the module 30 at the edge thereof --; and
Column 6, line 68, delete "quadrilateral" and insert -- four-sided curved frame --.

Signed and Sealed this

Twenty-eighth Day of December 1982

[SEAL]

Attest:

GERALD J. MOSSINGHOFF

Attesting Officer

Commissioner of Patents and Trademarks